Jan. 5, 1971     J. E. SHEA     3,553,575
CAPACITIVE SENSING DEVICE HAVING A SLIDABLE PROBE
Filed Nov. 27, 1967
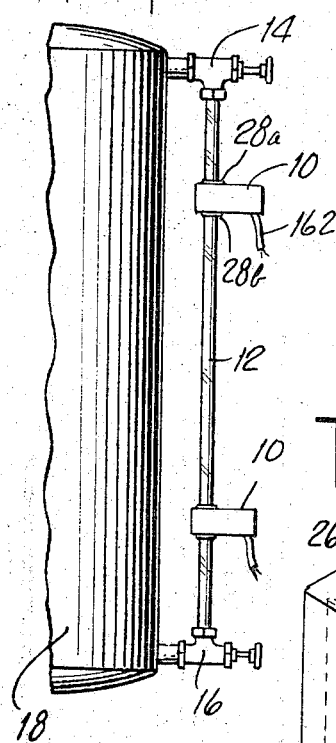
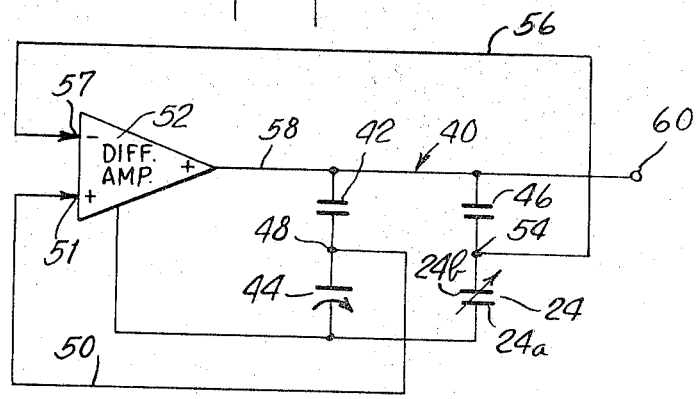
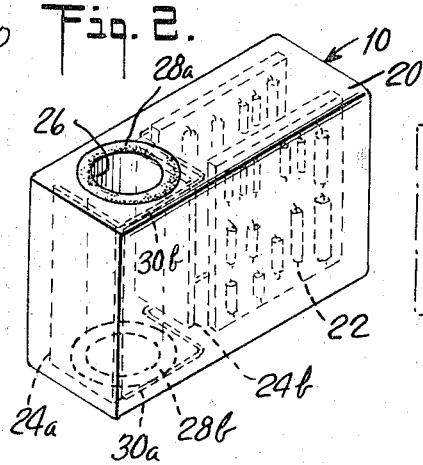
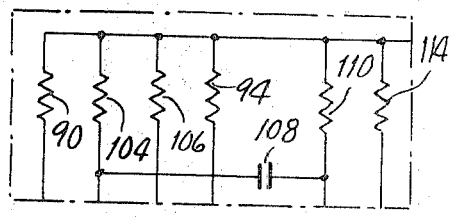
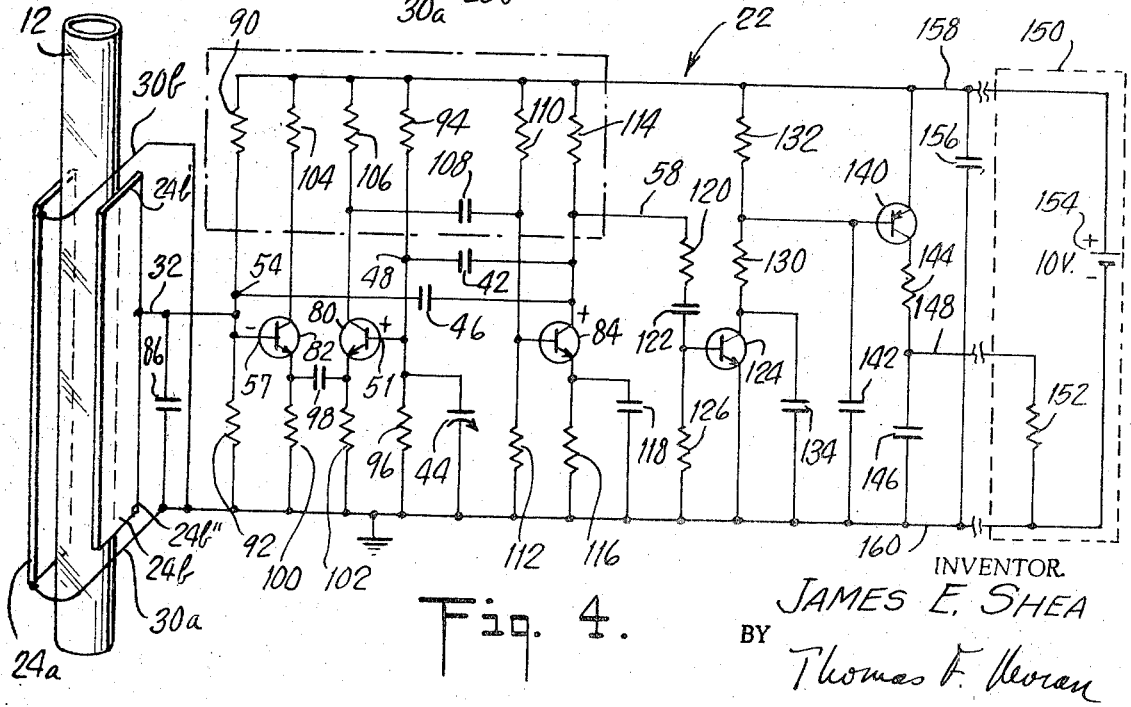
INVENTOR.
JAMES E. SHEA
BY Thomas F. Moran
ATTORNEY United States Patent Office 3,553,575
Patented Jan. 5, 1971

3,553,575
CAPACITIVE SENSING DEVICE HAVING A SLIDABLE PROBE
James E. Shea, Wilton, Conn., assignor to Sonic Engineering Corporation, Norwalk, Conn., a corporation of Connecticut
Filed Nov. 27, 1967, Ser. No. 685,866
Int. Cl. G01n 27/26
U.S. Cl. 324—61           8 Claims

ABSTRACT OF THE DISCLOSURE

A sensing device for detecting the position of an object, typically the presence of a medium, such as a fluid in a sight glass. A pair of capacitor plates is mounted adjacent to a reference position, and the capacitance is affected by the presence of the object. The capacitor plates are included as circuit elements in an oscillator circuit in which oscillation is controlled by capacitance, typically so that oscillation occurs when the object is present adjacent to the capacitor plates.

BACKGROUND OF THE INVENTION

The present invention is directed to sensing devices, and particularly to devices for sensing the presence or absence of an object with respect to a reference position. The invention finds particular application in the sensing of the level of a liquid in a sight glass.

The invention involves the use of a capacitor element at a reference position, the capacitance of which is affected by the presence or absence of an object with respect to the reference position. The capacitor element is included in an oscillator circuit to control oscillation dependent upon the position of the object with respect to the capacitor element. The circuit may be connected so that oscillation occurs when the object is in the region of the capacitor element, or oscillation may occur when the object is not within the region of the capacitor element.

Capacitor elements have been employed in the past to sense the presence or absence of a medium. In the present invention the change in capacitance is employed to control oscillation of an oscillator circuit. The presence or absence of oscillation may be detected for the purpose of suitable control.

In the present invention the capacitor element and oscillator circuit associated therewith are conveniently packaged in a single unit or body member, such as a block of plastic. When the device is to be used to determine the level of a liquid in a sight glass, the body member includes a passage therethrough engaging the sight glass so that the body member may slide along the sight glass to any position desired. One or more of the devices may be employed on a single sight glass, for example, to control the high and low levels of the fluid within the tube.

The invention will be more completely understood by reference to the following detailed description of representative embodiments thereof.

BRIEF DESCRIPTION OF THE DRAWINGS

FIG. 1 is a view of a sight glass having two sensing devices positioned thereon in accordance with the invention.

FIG. 2 is a perspective view, to enlarged scale, of one of the sensing devices of FIG. 1.

FIG. 3 is a block diagram of an oscillator circuit in accordance with the invention.

FIG. 4 is a schematic circuit diagram of a circuit in accordance with the invention but also showing, in perspective a pair of capacitor plates mounted adjacent to a sight glass in accordance with the invention.

FIG. 5 is a schematic circuit diagram of an alternative form of a portion of the circuit of FIG. 4.

DETAILED DESCRIPTION

In FIG. 1 the invention is shown by way of example as embodied in an object sensing system, specifically, a liquid level sensing system. A pair of sensing devices 10 is shown, in which each sensing device is mounted on a sight glass 12. The sight glass is connected between valves 14 and 16 coupled to a tank 18 which may contain a liquid therein. The liquid in the tank 18 flows through the valve 16 and upwardly within the sight glass 12 to a level the same as the level of the main body of fluid in the tank 18. The upper one of the sensing devices 10 may be employed to sense the high level of fluid within the sight glass 12 and to provide a signal, for example, when the level of fluid within the sight glass is above the level of the upper sensing device 10. The lower sensing device may be employed to detect the lower level of the fluid and to generate a signal for example, if the level of the fluid within the sight glass 12 falls below the level of the lower sensing device 10.

The sensing devices 10 are each as shown in FIG. 2. Each sensing device includes a body member 20 typically of plastic in which is imbedded a circuit 22 shown diagrammatically in FIG. 2. A pair of capacitor plates 24a and 24b is imbedded within the body 20 adjacent to a cylindrical passage 26 through the body. The body member 20 is mounted so that the sight glass 12 passes through the passage 26. Typically rubber O-rings 28a and 28b are included at the upper and lower ends of the passage 26. In practice, the space between the passage 26 and the sight glass is filled with a non-conducting liquid such as oil to prevent the accumulation of water condensation which would affect the capacitance of the plates 24a and 24b The O-rings may then be moved against the body 20 to maintain it in position on the sight glass and also to prevent the non-conducting liquid from leaking out of the passage 26 along the sight glass. The O-rings 28a ad 28b may be adhesively secured to the body 20 if desired.

The capacitor plates 24a and 24b are typically flat plates; however, they may be other shapes as well. One of the capacitor plates is typically connected to ground or other reference potential. In FIG. 2 the plate 24a is considered connected to ground or reference potential by a pair of conductors 30a and 30b. FIG. 4 shows the plates 24a and 24b along with the conductors 30a and 30b. It will be noted that the capacitor plates 24a and 24b are positioned near each other with the sight glass 12 passing therebetween. It will also be noted that the conductors 30a and 30b, which are at ground or other reference potential, are positioned adjacent and parallel to edges 24b′ and 24b″ of the capacitor plate 24b. The wires 30a and 30b thus provide a shield with respect to the capacitor plate 24b, which is at some other potential than reference potential. Shielding is desirable when two of the sensing devices are positioned adjacent to each other. In FIG. 4 the capacitor plate 24b is shown connected by conductor 32 to the circuit 22, which is the circuit shown diagrammatically in FIG. 2.

As noted above, the sensing device 10 is mounted in any arbitrary position along the sight glass 12. The capacitor plates 24a and 24b which are electrically connected in the circuit 22 provide a varying capacitance for that circuit dependent upon the presence or absence of liquid within the sight glass adjacent to the capacitor plates. The presence or absence of liquid is employed to provide either oscillation or no oscillation in the circuit of FIG. 2.

FIG. 3 shows a representative oscillator circuit in accordance with the invention. A variable capacitor 24, representing the capactior plates 24a and 24b, is included in a capacitor network 40. The capacitor 24 is shown as being variable, inasmuch as the capacitance of the plates 24a and 24b is varied by the presence or absence of liquid opposite the plates in the sight glass. The network 40 includes two capacitive legs. The first leg is formed of a fixed capacitor 42 and a trimmer capacitor 44. The second leg is composed of a fixed capacitor 46 and the variable capacitor 24 formed of the capacitor plates 24a and 24b mounted in the body 20 of FIG. 2. If desired, the trimmer and variable capacitors could be located in the same leg, in which case the other leg would include two fixed capacitors. The junction 48 of the fixed capacitor 42 and trimmer capacitor 44 is connected by conductor 50 to one input 51 of a differential amplifier 52. For reference this input is designated as a positive input. The junction 54 of the fixed capacitor 46 and the variable capacitor 24 is connected by a conductor 56 to another input 57 of the differential ampliler 52, designated as a negative input. The output of the differential amplifier 52 is connected by conductor 58 to the network 40 as shown.

The capacitance of the variablecapacitor 24 modifies the loop gain of the circuit involving the differential amplifier 52 and the network 40. For certain values of capacitance the loop gain will be greater than unity, in which case oscillation will occur within the differential amplifier and oscillating voltage will appear at output terminal 60. For other values of capacitance of the variable capacitor 24, the loop gain will be less than unity, in which case no oscillation will occur and a non-varying signal will be produced at the output terminal 60. Suitable circuitry may be connected to the terminal 60 to detect the presence or absence of oscillation.

Explaining further the operation of the circuit of FIG. 3, it is noted that the loop gain is a product of the gain of the differential amplifier and the difference between the gains of the two capacitor circuits. One capacitor circuit is composed of capacitors 42 and 44; the other circuit is composed of capacitors 46 and 24. If this product is positive and greater than unity, oscillation occurs. If this product is negative or is positive but less than unity, oscillation does not occur. The conditions for oscillation are stated more exactly in the literature. For example, see H. Nyquist, "Regeneration Theory," Bell System Technical Journal, vol. 11, page 126 (January 1932).

The gain of one capacitor circuit is the ratio of the AC voltage at junction point 48 to the AC voltage on conductor 58 (designated herein as gain A). The gain of the other capacitor circuit is the ratio of the AC voltage at junction point 54 to the AC voltage on conductor 58 (designated herein as gain B). If the capacitance of capacitor 24 is changed, the gain of that capacitor circuit (gain B) is also changed. The difference between the gains of the two capactior circuits is positive or negative, depending upon the capacitance of capacitor 24, once the trimmer capacitor 44 has been adjusted. Changing the setting of the trimmer capacitor changes the value of capacitance of capacitor 24 for which the difference in gains is zero. For oscillation to occur, the AC gain A must be greater than the AC gain B. If the AC gain A is smaller than the AC gain B, oscillation does not occur.

In typical operation the difference between the gains A and B is very close to zero and the gain of the amplifier 52 is very large. In this region a very small increase in capacitance of capacitor 24 changes the difference of the gains A and B from negative to positive and changes the condition of the system from no oscillation to oscillation. Similarly a small decrease in capacitance changes the condition of the system from oscillation to no oscillation.

In practice, a circuit such as that of FIG. 3, which is incorporated in the sensing device 10 of FIG. 2, is employed to oscillate or not oscillate when the liquid level in the sight glass 12 is respectively above or below a predetermined position with respect to the capacitor plates 24a and 24b. An alternative mode of operation is to have the circuit not oscillate or oscillate when the liquid level is respectively above or below the predetermined position. The trimmer capacitor 44 of the circuit of FIG. 3 is adjusted so as to set the predetermined position.

FIG. 4 includes a detailed schematic circuit diagram of a circuit in accordance with FIG. 3. Like components are given the same reference numerals in order to simplify the description. In particular, the trimmer capacitor 44, the fixed capacitors 42 and 46 and the variable capacitor 24, as formed from the capacitor plates 24a and 24b, and all of the circuit of FIG. 3, are included in the circuit of FIG. 4 as shown. It will be noted that the connections of these elements is the same as that in FIG. 3. In particular, the junction 48 of fixed capacitor 42 and trimmer capacitor 44 is connected to input terminal 51 of the differential amplifier. In this case, the input terminal 51 corresponds to the base of an active circuit element such as a transistor 80 serving as part of the differential amplifier. The junction 54 of the fixed capacitor 46 and the variable capacitor formed from the capacitor plates 24a and 24b is connected to input terminal 54 of the differential amplifier. In this case input terminal 57 is the base of an active circuit element, such as a transistor 82, forming a part of the differential amplifier. Another active circuit element such as transistor 84 is included within the differential amplifier and serves as a high-gain amplification stage to provide an output signal on the output conductor 58, as in the circuit of FIG. 3. The collector of the transistor 84 is connected to the output conductor 58.

In the circuit of FIG. 4 the capacitor plates 24a and 24b are shown shunted by a capacitor 86. The capacitor 86 may be of fixed or variable capacitance added to the circuit if needed to improve the response of the circuit. In practice it has been found that the capacitor 86 may be eliminated since the stray capacitance of the conductors and other circuit elements effectively provides such shunt capacitance.

In the circuit of FIG. 4, the transistors 80 and 82 are connected as a differential amplification stage. Input signals to the differential amplifier are coupled to the bases of these transistors through input terminals 51 and 57, as noted above. The base circuit of the transistor 82 includes bias resistors 90 and 92. Similarly, the base circuit of transistor 80 includes bias resistors 94 and 96. The emitters of the transistors 80 and 82 are coupled together by a capacitor 98. The capacitor 98 couples together the emitters to provide AC coupling while isolating the emitters from each other with respect to DC current. The DC isolation provided by the capacitor 98 permits separate biasing of the emitters by virtue of bias resistors 100 and 102. The collectors of the transistors 80 and 82 are connected to load resistors 104 and 106.

The differential amplification stage constituted by transistors 80 and 82 and the associated circuit elements is coupled by a capacitor 108 to the input of the high-gain amplification stage represented by transistor 84. In FIG. 4 the collector of the transistor 80 constitutes the output of the differential amplification stage, and it is this collector which is coupled to the base of transistor 84 constituting the input of the high-gain amplification stage. The capacitor 108 provides AC coupling between the transistors 80 and 84, while at the same time permitting DC isolation for the purpose of separate biasing. Base biasing of the transistor 84 is provided for by resistors 110 and 112. The collector of the transistor 84 is provided for by resistors 110 and is coupled to load resistor 114, while the emitter is connected to bias resistor 116. A capacitor 118 is also connected to the emitter of the transistor 84 to provide AC bypassing of the emitter for the purpose of obtaining high gain.

The output from the transistor 84, i.e. from the collector of that transistor, is connected by output conductor 58 to a resistor 120. The signal from the conductor 58 passes through the resistor 120 and an output coupling capacitor 122 to the base of a transistor 124 which serves as an RF detector to detect oscillation provided from the transistor 84. The resistor 120 prevents heavy loading of the transistor 124. Resistor 126 is employed to provide biasing of the base of the transistor 124.

The transistor 124 and assocated circuit elements constitute an RF detector operating in the collector detector mode. The emitter of this transistor is directly grounded, while the collector is coupled through a current limiting resistor 130 and a bias resistor 132 to the power supply line. The collector of this transistor is also connected to a capacitor 134 which constitutes a storage capacitor to smooth the output signal from the transistor 124. Without the capacitor the signal from the collector of the transistor 124 would constitute a series of pulses; with the capacitor, the pulses are smoothed to provide a continuous signal.

An output signal is taken from the junction of the resistors 130 and 132 and is applied to the base of a transistor 140 serving as an output amplifier. The base circuit includes a capacitor 142 to ground, while the collector includes a resistor 144 and capacitor 146 to ground. The capacitor 142, in conjunction with resistors in the circuit, provides for smoothing of the signal applied to the base of the transistor 140 to render the circuit immune from random noise. Without the capacitor 142, random noise signals might cause the transistor 140 to generate an output signal which could be detected, indicating for example a change in liquid level when in fact none had occurred. The resistor 144 is a current limiting resistor.

The output from the collector of the transistor 140 is applied by a conductor 148 to a load 152. The load 152 may be a relay coil or computer logic circuit, for example. The load forms part of a circuit 150 which includes a power supply 154 (given, for example, as 10 volts DC). Typically the circuit 150 is remote from the sensing device 10 shown in FIG. 2 and is connected thereto by a long cable (162 in FIG. 1) which consists of conductors 148, 158, and 160. Due to the use of a long cable there may be stray pickup of signals. The capacitors 146 and 156 shunt such stray pickup signals on conductors 148 and 158 to ground.

The circuit of FIG. 4 operates as described above in FIG. 3. That is, the capacitors 42, 44, 46 and 24 constitute a capacitive network which provdes for oscillation or no oscillation depending upon the loop gain of the circuit. The circuit of FIG. 4 is connected so that oscillation will occur when the level of liquid within the sight glass 12 reaches a predetermined reference level between the capacitor plates 24a and 24b or is above that level. As noted above in connection with FIG. 3, the trimmer capacitor 44 is adjusted to vary that level. Oscillation will occur when the signal at the junction point 54 is smaller than the signal at the junction point 48. As the liqiud level rises in the sight glass, the capacitance of the plates 24a and 24b increases, lowering the impedance across the plates and decreasing the signal applied to transistor input 57. Such change is in the reinforcement of the polarity shown, and oscillation continues.

If it is desired to have the circuit of FIG. 4 oscillate when the liquid is at or below the reference level, rather than above it, a modification such as shown in FIG. 5 is made. In particular, the capacitor 108 is connected not to the resistor 106, as in FIG. 4 (i.e., to the collector of transistor 80), but rather is connected to the resistor 104 (i.e., to the collector of transistor 82). By this simple change oscillation is made to occur when the liquid level drops below the refernce level. To explain, the AC signal at the output of transistor 82 is essentially equal to the negative of the AC signal at the output of transistor 80. For oscillation to occur, the product of amplifier gain and the difference between the gains of the capacitor circuits (gain A minus gain B as explained above) must be positive and greater than unity. Since the amplifier gain has been made the negative of its former value, the condition for oscillation is satisfied when the different between the gains of the capacitor circuits is the negative of its former value. This means that the AC gain A must be smaller than the AC gain B (not larger as before). As before, the difference of capacitor circuit gains is typically very close to zero. Hence the condition for oscillation is satisfied when the capacitance of capacitor 24 is small (instead of large as before). This condition occurs when the liquid level is below the reference level.

What is claimed is:

1. A sensing device for detecting the presence of material within a tube comprising, in combination:
   a body member having a passage therein through which the tube extends;
   means for sliding the body member along the tube including a pair of O-rings mounted in said body member at opposite ends of said passage to permit the space between the passage and the tube to contain a non-conducting liquid;
   a pair of capacitor plates mounted in said body member on opposite sides of said passage;
   an electrical circuit including a source of reference potential mounted in said body member adjacent one of said capacitor plates for detecting changes in the capacitance of said capacitor plates; and
   means connecting said capacitor plates to said electrical circuit means.

2. A sensing device according to claim 1, including:
   a pair of wires, each connected between the other of said capacitor plates and said source of reference potential and extending along opposite edges of said one of said capacitor plates in order to provide shielding with respect to said one of said capacitor plates.

3. A sensing device according to claim 1, in which the body member is of solid plastic material, and the capacitor plates and electrical circuit are embedded within the body member.

4. A sensing device as defined in claim 1, in which the circuit comprises an oscillator and including a differential amplifier having an input means and an output means, and an electrical network including the capacitor plates therein coupling the output means of the differential amplifier to the input means.

5. A sensing device as defined in claim 4, in which the electircal network includes two capacitive legs, each leg having two capacitors therein, a capacitor in one of the legs being constituted by the capacitor plates mounted within the body member, another capacitor in one of the legs being variable, and wherein the differential amplifier includes two inputs, one of the inputs being coupled to the junction of the capacitors in one of said legs and the other input of the amplifier being coupled to the junction of the capacitors in the other of the legs.

6. A sensing device as defined in claim 4, in which the differential ampilfier comprises a differential amplifier stage including two active circuit elements having output connection and a high-gain amplifier stage coupled to one of the output connections.

7. A sensing device as defined in claim 6, in which the high-gain amplifier stage is coupled to one of the ouput connections in order to provide oscillation when the material is above a reference position within the tube and wherein the high-gain amplifier stage is coupled to the other output connection to provide oscillation when the material within the tube is below the reference position.

8. A sensing device as defined in claim 4, in which the electrical network includes two capacitive legs, each leg having a fixed capacitor and a variable capacitor therein, the variable capacitor in one of the legs being constituted by the capacitor plates mounted within the body member and with variation in capacitance being occasioned by changes in level of the material within the tube, and wherein the differential amplifier includes two inputs, one of the inputs being coupled to the junction of the fixed and variable capacitors in one of said legs and the other input of the amplifier being coupled to the junction of the fixed and variable capacitors in the other of the legs.

References Cited

UNITED STATES PATENTS

| | | | |
|---|---|---|---|
| 978,983 | 12/1910 | Brent | 340—244 |
| 2,428,700 | 10/1947 | Eilenberger | 324—61 |
| 2,817,234 | 12/1957 | Campbell | 73—304 |
| 2,882,520 | 4/1957 | Hass | 340—244X |
| 2,951,211 | 8/1960 | Brashear | 330—69X |
| 3,031,617 | 4/1962 | Paquette | 324—61 |
| 3,037,165 | 5/1962 | Kerr | 324—61 |
| 3,127,577 | 3/1964 | LaPointe | 331—110X |
| 3,188,576 | 6/1965 | Lewis | 330—69X |
| 3,254,333 | 5/1966 | Baumoel | 340—244 |
| 3,303,698 | 2/1967 | Loepfe | 324—61X |
| 2,992,391 | 7/1961 | Haynes | 324—61 |
| 2,992,392 | 7/1961 | Haynes | 324—61 |

EDWARD E. KUBASIEWICZ, Primary Examiner

U.S. Cl. X.R.

73—304; 330—30; 331—65; 340—244